US011124199B2

(12) United States Patent
Cui et al.

(10) Patent No.: US 11,124,199 B2
(45) Date of Patent: Sep. 21, 2021

(54) AUTOMATIC DRIVING SYSTEM, FAULT ALARM METHOD AND DEVICE

(71) Applicant: Baidu Online Network Technology (Beijing) Co., Ltd., Beijing (CN)

(72) Inventors: Yue Cui, Beijing (CN); Yaling Zhang, Beijing (CN); Ji Tao, Beijing (CN)

(73) Assignee: Baidu Online Network Technology (Beijing) Co., Ltd, Beijing (CN)

( * ) Notice: Subject to any disclaimer, the term of this patent is extended or adjusted under 35 U.S.C. 154(b) by 206 days.

(21) Appl. No.: 16/515,847

(22) Filed: Jul. 18, 2019

(65) Prior Publication Data
US 2020/0079392 A1 Mar. 12, 2020

(30) Foreign Application Priority Data
Sep. 7, 2018 (CN) .......................... 201811042110.9

(51) Int. Cl.
*B60W 50/02* (2012.01)
*G07C 5/08* (2006.01)
(Continued)

(52) U.S. Cl.
CPC ........... *B60W 50/02* (2013.01); *G05D 1/0088* (2013.01); *G07C 5/008* (2013.01); *G07C 5/0808* (2013.01);
(Continued)

(58) Field of Classification Search
CPC ......... B60W 50/02; B60W 2050/0002; B60W 2050/021; B60W 2050/046; G05D 1/0088;
(Continued)

(56) References Cited

U.S. PATENT DOCUMENTS

2004/0243287 A1 12/2004 Yanaka et al.
2015/0049189 A1* 2/2015 Yau .................. G08B 13/19697
348/143
2015/0323928 A1 11/2015 Yim et al.

FOREIGN PATENT DOCUMENTS

CN 102881053 A 1/2013
CN 103634166 A 3/2014
(Continued)

OTHER PUBLICATIONS

CNBLUSP201904471—The First Office Action of parallel JP application dated Sep. 30, 2020; 5 pages.
(Continued)

*Primary Examiner* — Gertrude Arthur Jeanglaude
(74) *Attorney, Agent, or Firm* — Pearne & Gordon LLP

(57) ABSTRACT

The present disclosure provides an automatic driving system, fault alarm method and device, the system includes a primary monitoring device, an auxiliary monitoring device, at least one device to be detected and a fault alarm device; where the primary monitoring device and the auxiliary monitoring device are respectively connected to each device to be detected and the fault alarm device; the primary monitoring device and the auxiliary monitoring device are connected, the primary monitoring device and the auxiliary monitoring device respectively perform a fault detection on the each device to be detected; and if it is detected that any device to be detected is abnormal, the primary monitoring device or the auxiliary monitoring device sends an alarm instruction to the fault alarm device, so that the fault alarm device performs an alarm operation according to the alarm instruction.

19 Claims, 6 Drawing Sheets

(51) Int. Cl.
*G07C 5/00* (2006.01)
*G05D 1/00* (2006.01)
*B60W 50/04* (2006.01)
*B60W 50/00* (2006.01)

(52) U.S. Cl.
CPC ... *G07C 5/0841* (2013.01); *B60W 2050/0002* (2013.01); *B60W 2050/021* (2013.01); *B60W 2050/046* (2013.01); *G05D 2201/0213* (2013.01)

(58) Field of Classification Search
CPC ............ G05D 2201/0213; G07C 5/008; G07C 5/0808; G07C 5/0841
USPC ........................................................ 701/29.1
See application file for complete search history.

(56) References Cited

FOREIGN PATENT DOCUMENTS

| | | |
|---|---|---|
| CN | 104228677 A | 12/2014 |
| CN | 204496282 U | 7/2015 |
| CN | 204821320 U | 12/2015 |
| CN | 105922946 A | 9/2016 |
| CN | 105976450 A | 9/2016 |
| CN | 106970619 A | 7/2017 |
| CN | 108196547 A | 6/2018 |
| CN | 103427402 A | 8/2018 |
| DE | 102010021591 A1 | 12/2011 |
| EP | 102010021591 A1 * | 12/2011 |
| JP | 2003058978 A | 2/2003 |
| JP | 2010280383 A | 12/2010 |
| JP | 2012190152 A | 10/2012 |
| JP | 2018101434 A | 6/2018 |

OTHER PUBLICATIONS

The Second OA of the priority application No. 201811042110.9 dated May 28, 2020; 11 pages.
The first Office Action of CN 201811042110.9 dated Nov. 21, 2019; 11 pages.
European Search Report (Partial ESR of EPI 9180882.3-1012) dated Feb. 20, 2120; 14 pages.
CNBLUSP201904471—Chrysler electric component location manual; 7 pages.
CNBLUSP201904471—The Rejection of priority application dated Mar. 24, 2021; 10 pages.
The Final OA of JP application No. 2019-131894 in related matter dated May 6, 2021; 8 pages.

* cited by examiner

AUTOMATIC DRIVING SYSTEM, FAULT ALARM METHOD AND DEVICE

CROSS-REFERENCE TO RELATED APPLICATION

This application claims priority to Chinese Patent Application No. 201811042110.9, filed on Sep. 7, 2018, which is hereby incorporated by reference in its entirety.

TECHNICAL FIELD

Embodiments of the present disclosure relate to a field of automatic driving technologies, and in particular, to an automatic driving system, fault alarming method and device.

BACKGROUND

An automatic driving vehicle can improve road safety and provide people with new means of travel, making people's lives more convenient. No matter it is commuting, remote self-driving tour, or order delivery, the automatic driving vehicle has great potential.

The automatic driving vehicle is also known as a driverless vehicle, a computer-driven vehicle, or a wheeled mobile robot, and is smart car that achieves self-driving by a computer system. The automatic driving vehicle mainly relies on an artificial intelligence, an visual computing, radar, a monitoring apparatus and a global positioning system to work together, and allows a computer to operate a motor vehicle automatically and safely without any human active operation. A safety of the automatic driving vehicle and a control efficiency of the automatic driving vehicle are most critical indicators for the automatic driving vehicle.

At present, there are various faults and unstable phenomena in an iterative development of an automatic driving system. These potential faults and risk of the vehicle will directly lead to abnormal vehicle behavior, even collision damage, which poses a great safety hazard to a commissioning personnel and device property of the vehicle.

SUMMARY

The present disclosure provides an automatic driving system, fault alarm method and device, which reduce an occurrence rate of a safety accident caused by a device fault in the automatic driving system.

A first aspect of the present disclosure provides an automatic driving system, including: a primary monitoring device, an auxiliary monitoring device, at least one device to be detected and a fault alarm device;

where the primary monitoring device and the auxiliary monitoring device are respectively connected to each device to be detected, the primary monitoring device and the auxiliary monitoring device are respectively connected to the fault alarm device;

the primary monitoring device and the auxiliary monitoring device are connected, the primary monitoring device and the auxiliary monitoring device are respectively configured to perform a fault detection on the each device to be detected; and if it is detected that any device to be detected is abnormal, the primary monitoring device or the auxiliary monitoring device sends an alarm instruction to the fault alarm device; and the fault alarm device performs an alarm operation according to the alarm instruction.

In an embodiment, the at least one device to be detected includes at least one of a vehicle motion device, an environment sensing device, a vehicle control device and a power device.

In an embodiment, the vehicle motion device includes at least one of a speed sensor, an angle sensor and an integrated navigation device.

In an embodiment, the environment sensing device includes at least one of a lidar sensor, a millimeter wave radar sensor, an ultrasonic sensor and a camera.

In an embodiment, the vehicle control device includes at least one of a brake device, a steering device, an engine and a gearbox.

In an embodiment, the system further includes: a remote control device, where the remote control device is respectively connected to the primary monitoring device, the auxiliary monitoring device and the fault alarm device;

the primary monitoring device and the auxiliary monitoring device send the alarm instruction to the fault alarm device through the remote control device accordingly.

In an embodiment, the fault alarm device includes at least one of an in-vehicle alarm device and an out-vehicle alarm device.

In an embodiment, the in-vehicle alarm device includes at least one of an in-vehicle voice alarm device, a display alarm prompt device and an AR alarm prompt device.

In an embodiment, the out-vehicle alarm device includes at least one of an alarm indicator light and an out-vehicle voice alarm device.

A second aspect of the present disclosure provides a fault alarm method, including:

determining, by a monitoring device, a detection result of a first device to be detected; and if the detection result indicates that the first device to be detected is abnormal, sending, by the monitoring device, an alarm instruction to a fault alarm device, so that the fault alarm device performs an alarm operation according to the alarm instruction.

In an embodiment, there are at least two first devices to be detected that are abnormal; the if the detection result indicates that the first device to be detected is abnormal, sending, by the monitoring device, an alarm instruction to a fault alarm device includes:

determining, by the monitoring device, an abnormal type of each of the first devices to be detected;

determining, by the monitoring device, an alarm sequence of the first device to be detected according to the abnormal type and a preset abnormal type priority; and sending, by the monitoring device, the alarm instruction to the fault alarm device according to the alarm sequence.

In an embodiment, the abnormal type of the first device to be detected that is abnormal includes: a working parameter abnormality, a connection state abnormality, a storage state abnormality and a log sequence abnormality.

In an embodiment, a priority of the connection state abnormality> a priority of the log sequence abnormality> a priority of the working parameter abnormality> a priority of the storage state abnormality.

A third aspect of the present disclosure provides a fault alarm method, including:

receiving, by a fault alarm device, an alarm instruction sent by a monitoring device; and performing, by the fault alarm device, an alarm operation according to the alarm instruction.

In an embodiment, the receiving, by a fault alarm device, an alarm instruction sent by a monitoring device includes:

receiving, by the fault alarm device, the alarm instruction sent by the monitoring device through a remote control device.

A fourth aspect of the present disclosure provides a monitoring device, including:

a determining module, configured to determine a detection result of first devices to be detected; and a sending module, configured to, if the detection result indicates that the first device to be detected is abnormal, send an alarm instruction to a fault alarm device, so that the fault alarm device performs an alarm operation according to the alarm instruction.

In an embodiment, the determining module is specifically configured to determine an abnormal type of each of the first devices to be detected;

the determining module is further configured to determine an alarm sequence of the first device to be detected according to the abnormal type and a preset abnormal type priority; and the sending module is specifically configured to send the alarm instruction to the fault alarm device according to the alarm sequence.

In an embodiment, the abnormal type of the first device to be detected that is abnormal includes: a working parameter abnormality, a connection state abnormality, a storage state abnormality and a log sequence abnormality.

In an embodiment, a priority of the connection state abnormality> a priority of the log sequence abnormality> a priority of the working parameter abnormality> a priority of the storage state abnormality.

A fifth aspect of the present disclosure provides a fault alarm device, including:

a receiving module, configured to receive an alarm instruction sent by a monitoring device; and a performing module, configured to perform an alarm operation according to the alarm instruction.

In an embodiment, the receiving module is specifically configured to receive the alarm instruction sent by the monitoring device through a remote control device.

A sixth aspect of the present disclosure provides a monitoring device, including:

a memory;

a processor; and a computer program;

where the computer program is stored in the memory and is configured to be executed by the processor to implement the fault alarm method of any one of the second aspect of the present disclosure.

A seventh aspect of the present disclosure provides a fault alarm device, including:

a memory;

a processor; and a computer program;

where the computer program is stored in the memory and is configured to be executed by the processor to implement the fault alarm method of any one of the third aspect of the present disclosure.

An eighth aspect of the present disclosure provides a computer readable storage medium, where a computer program is stored on the computer readable storage medium, the computer program is executed by a processor to implement the fault alarm method of any one of the second aspect or the fault alarm method of any one of the third aspect.

The embodiments of the present disclosure provide an automatic driving system, fault alarm method and device, the system includes a primary monitoring device, an auxiliary monitoring device, at least one device to be detected and a fault alarm device; where the primary monitoring device and the auxiliary monitoring device are respectively connected to each device to be detected and the fault alarm device; the primary monitoring device and the auxiliary monitoring device are connected, the primary monitoring device and the auxiliary monitoring device respectively perform a fault detection on the each device to be detected; and if it is detected that any device to be detected is abnormal, the primary monitoring device or the auxiliary monitoring device sends an alarm instruction to the fault alarm device, so that the fault alarm device performs an alarm operation according to the alarm instruction. The above system monitors a key device on a vehicle in real time through the monitoring devices, and reminds through the fault alarm device when it is determined that there is an abnormality, thereby reducing the occurrence rate of a safety accident caused by the device fault in the system.

DESCRIPTION OF EMBODIMENTS

Exemplary embodiments will be described in detail herein, examples of which are illustrated in the accompanying drawings. When the following description refers to the accompanying drawings, the same number in different figures represents the same or similar elements unless otherwise indicated. The embodiments described in the following exemplary embodiments do not represent all implementations consistent with the present disclosure. Instead, they are merely examples of apparatuses and methods consistent with aspects of the present disclosure as detailed in the appended claims.

The terms "first", "second" and the like in the specification and claims of the present disclosure and the above drawings are used to distinguish similar objects, and are not necessarily used to describe a particular order or precedence order. It is to be understood that the data used herein may be interchanged where appropriate so that the embodiments of the present disclosure described herein can be implemented in a sequence other than those illustrated or described herein. In addition, the terms "including" and "having" and any variants thereof are intended to cover a non-exclusive inclusion. For example, a process, method, system, product, or device that includes a series of steps or units are not necessarily limited to those steps or units that are clearly listed, but may include other steps or units that are not explicitly listed or are inherent to such process, method, product, or device.

The "an embodiment" or "another embodiment" referred to throughout the specification of the present disclosure means that a particular feature, structure or characteristic relating to the embodiment is included in at least one embodiment of the present application. The feature "in the embodiment" or "in some embodiments" which appears throughout the specification, does not necessarily refer to the same embodiment. It should be noted that the embodiments in the present disclosure and the features in the embodiments may be combined with each other without conflict.

The technical solution of the present disclosure will be described in detail below with reference to specific embodiments. The following specific embodiments may be combined with each other, and are not to be further described in some embodiments for the same or similar concepts or processes.

Figure 1:
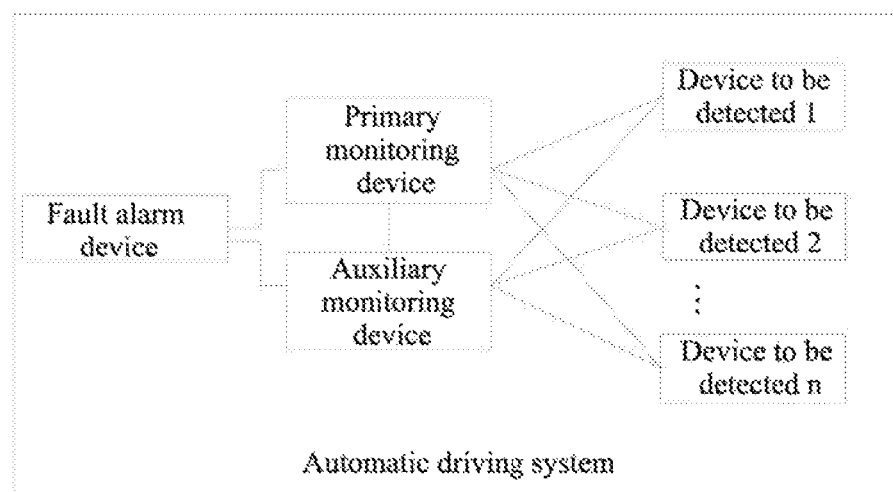
FIG. 1 is a schematic structural diagram of an automatic driving system according to an embodiment of the present disclosure.

FIG. 1 is a schematic structural diagram of an automatic driving system according to an embodiment of the present disclosure, FIG. 1 shows n device to be detected, where n is an integer greater than or equal to 1.

As shown in FIG. 1, the automatic driving system provided by the embodiment includes: a primary monitoring device, an auxiliary monitoring device, at least one device to be detected and a fault alarm device; the primary monitoring device and the auxiliary monitoring device are respectively connected to each device to be detected, the primary monitoring device and the auxiliary monitoring device are respectively connected to the fault alarm device;

the primary monitoring device and the auxiliary monitoring device are connected, the primary monitoring device and the auxiliary monitoring device are respectively configured to perform a fault detection on the each device to be detected; and if it is detected that any device to be detected is abnormal, the primary monitoring device or the auxiliary monitoring device sends an alarm instruction to the fault alarm device; and the fault alarm device performs an alarm operation according to the alarm instruction.

In the embodiment, the primary monitoring device includes a first information processing unit and a first communication unit, the first information processing unit is respectively connected to the each device to be detected and the first communication unit.

The first information processing unit is configured to obtain device information of the each device to be detected, and determine whether the device to be detected is abnormal according to the device information, the first information processing unit is further configured to obtain device information of the each device to be detected sent by the auxiliary monitoring device, and determine whether the device to be detected is abnormal after data information is synchronized. The first communication unit is configured to send an alarm instruction to the fault alarm device.

Accordingly, the auxiliary monitoring device includes a second information processing unit and a second communication unit, the second information processing unit is respectively connected to the each device to be detected and the second communication unit, and the second communication unit is connected to the first communication unit of the primary monitoring device.

The second information processing unit is configured to obtain device information of the each device to be detected, and determine whether the device to be detected is abnormal according to the device information. The second communication unit is configured to send the device information of the each device to be detected to the first communication unit of the primary monitoring device.

In the embodiment, the first information processing unit of the primary monitoring device can make a judgment according to the device information of the each device to be detected that is obtained by itself, and may also perform a comprehensive evaluation with reference to the device information of the each device to be detected sent by the auxiliary monitoring device, which is not specifically limited in this embodiment.

In an embodiment, the second communication unit is further configured to send an alarm instruction to the fault alarm device. Specifically, when the primary monitoring device fails, the auxiliary monitoring device makes a judgment according to the device information of the each device to be detected obtained by itself, and sends the alarm instruction to the fault alarm device through the second communication unit.

In the embodiment, the device information of the device to be detected includes, but is not limited to, a working parameter, a connection state, a storage state and a log sequence of the device. The primary monitoring device or the auxiliary monitoring device determines a detection result of the device to be detected according to the device information, and the detection result includes an abnormal detection result and a normal detection result.

An abnormal type of the abnormal detection result includes a working parameter abnormality, a connection state abnormality, a storage state abnormality and a log sequence abnormality.

After determining that the detection result is the abnormal detection result, the primary monitoring device or the auxiliary monitoring device sends the alarm instruction to the fault alarm device, so that the fault alarm device performs the alarm operation according to the alarm instruction.

In the embodiment, the at least one device to be detected includes at least one of a vehicle motion device, an environment sensing device, a vehicle control device and a power device.

The vehicle motion device includes at least one of a speed sensor, an angle sensor and an integrated navigation device. The speed sensor and the angle sensor provide relevant lateral and vertical information of a line control system of a vehicle; the integrated navigation device includes an inertial navigation device and a global positioning system and provides a full attitude information parameter and high precision positioning information.

The environment sensing device, that is, an environment sensing sensor, is a sensor responsible for environment sensing, and is similar to human vision and hearing. Without a support of the environment sensing sensor, the automatic driving function will not be realized. The environment sensing device includes at least one of a lidar sensor, a millimeter wave radar sensor, an ultrasonic sensor and a camera. Data fusion of the laser radar, camera, and millimeter wave radar is provided to a calculation unit for algorithm processing.

The vehicle control device includes at least one of a brake device, a steering device, an engine and a gearbox. The automatic driving system controls, through an electric signal, the brake device, steering device, engine and gearbox of the vehicle to operate, to realize functions such as adaptive cruising, emergency braking and automatic parking.

In some embodiments, the primary monitoring device includes a plurality of first information processing units, and the auxiliary monitoring device includes a plurality of second information processing units. Different first information processing units are configured to process device information of different devices to be detected and determine detection results of the devices to be detected; and different second information processing units are configured to process device information of different devices to be detected, and determine detection results of the devices to be detected.

When a certain first information processing unit of the primary monitoring device fails, the primary monitoring device may determine whether to switch the vehicle to a backup device of the device to be detected according to the detection result of the device to be detected determined by a corresponding second information processing unit in the auxiliary monitoring device for operation. Alternatively, the detection result is directly determined by the auxiliary monitoring device to determine whether to switch the vehicle to the backup device of the device to be detected for operation.

In some embodiments, the plurality of second information processing units of the auxiliary monitoring device are only configured to detect important devices to be detected on the vehicle. In other words, a number of the second information processing units of the auxiliary monitoring device is smaller than a number of the first information processing units of the primary monitoring device.

In the embodiment, the fault alarm device includes at least one of an in-vehicle alarm device and an out-vehicle alarm device.

The in-vehicle alarm device includes at least one of an in-vehicle voice alarm device, a display alarm prompt device and an AR alarm prompt device; and the out-vehicle alarm device includes at least one of an alarm indicator light and an out-vehicle voice alarm device.

It should be noted that the foregoing connection in the embodiment may be a wired connection or a wireless connection, which is not specifically limited in this embodiment.

The automatic driving system provided by the embodiment of the present disclosure includes a primary monitoring device, an auxiliary monitoring device, at least one device to be detected and a fault alarm device; where the primary monitoring device and the auxiliary monitoring device are respectively connected to each device to be detected and the fault alarm device; the primary monitoring device and the auxiliary monitoring device are connected, the primary monitoring device and the auxiliary monitoring device are respectively configured to perform a fault detection on the each device to be detected; and if it is detected that any device to be detected is abnormal, the primary monitoring device or the auxiliary monitoring device sends an alarm instruction to the fault alarm device, so that the fault alarm device performs an alarm operation according to the alarm instruction. The above system monitors a key device on a vehicle in real time through the monitoring devices, and reminds through the fault alarm device when it is determined that there is an abnormality, thereby reducing an occurrence rate of a safety accident caused by a device fault in the system.

Figure 2:
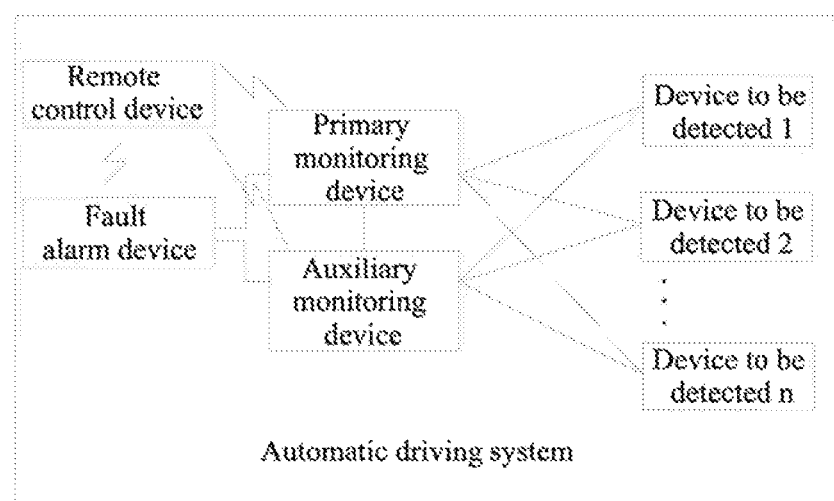
FIG. 2 is a schematic structural diagram of an automatic driving system according to another embodiment of the present disclosure.

FIG. 2 is a schematic structural diagram of an automatic driving system according to another embodiment of the present disclosure. On the basis of the automatic driving system shown in FIG. 1, the automatic driving system provided by this embodiment further includes: a remote control device, where the remote control device is respectively connected to the primary monitoring device, the auxiliary monitoring device and the fault alarm device;

the primary monitoring device and the auxiliary monitoring device send the alarm instruction to the fault alarm device through the remote control device accordingly.

In the embodiment, the remote control device is disposed in a control room of the automatic driving system, and the remote control device is in communication connection with the primary monitoring device and the auxiliary monitoring device amounted in the vehicle.

In a possible implementation, the first communication unit of the primary monitoring device and the second communication unit of the auxiliary monitoring device respectively send the device information of the at least one device to be detected to the remote control device, the remote control device determines, according to the received device information, whether the device to be detected is abnormal after the data information is synchronized, and if the device to be detected is abnormal, sends an alarm indication to the fault alarm device.

In another possible implementation manner, the first communication unit of the primary monitoring device and the second communication unit of the auxiliary monitoring device respectively send the detection result of the at least one device to be detected to the remote control device, the detection result is the abnormal detection result, and the remote control device determines, according to the received detection result, whether the device to be detected is abnormal after the data information is synchronized, and if the device to be detected is abnormal, sends an alarm indication to the fault alarm device.

The automatic driving system provided by the embodiment of the present disclosure includes: a primary monitoring device, an auxiliary monitoring device, at least one device to be detected, a remote control device and a fault alarm device, where the primary monitoring device and the auxiliary monitoring device are respectively connected to each device to be detected, the remote control device and the fault alarm device, the primary monitoring device and the auxiliary monitoring device are connected, the primary monitoring device and the auxiliary monitoring device respectively perform a fault detection on the each device to be detected, and the primary monitoring device and the auxiliary monitoring device send an alarm instruction to the fault alarm device through the remote control device. The above system comprehensively judges the detection result through the remote control device, determines whether to send the alarm instruction to the fault alarm device of the vehicle, which realizes remote control of the vehicle, thereby reducing the occurrence rate of a safety accident caused by the device fault in the system.

Based on the automatic driving system provided by any one of the above embodiments, a fault alarm method provided by the present disclosure will be described in detail below with reference to the accompanying drawings.

Figure 3:
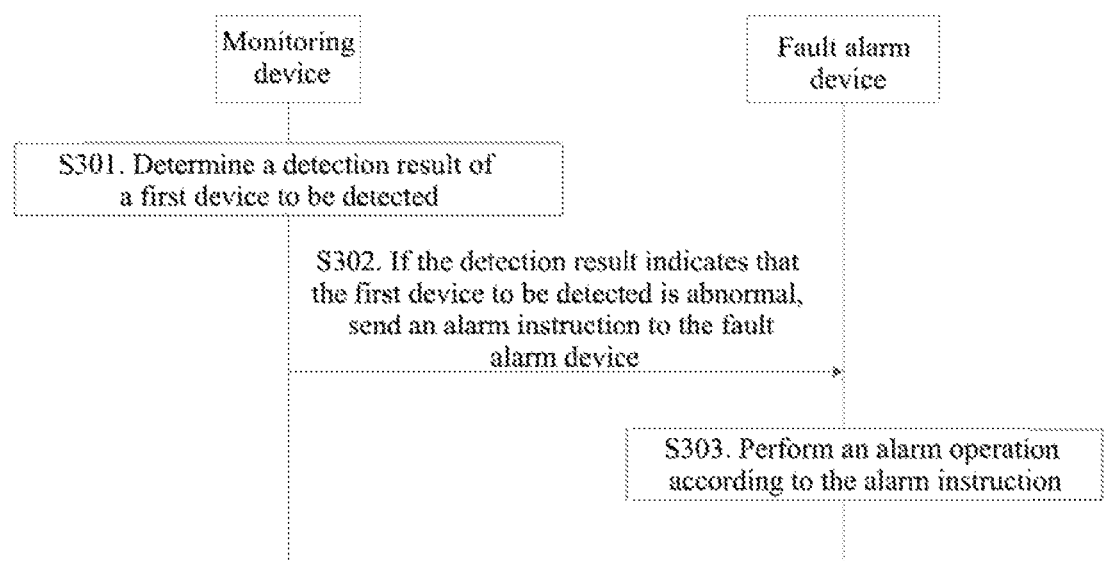
FIG. 3 is a schematic flowchart of a fault alarm method according to an embodiment of the present disclosure.

FIG. 3 is a schematic flowchart of a fault alarm method according to an embodiment of the present disclosure. As shown in FIG. 3, the fault alarm method provided by the present embodiment includes the following steps:

S301, a monitoring device determines a detection result of a first device to be detected;

S302, if the detection result indicates that the first device to be detected is abnormal, the monitoring device sends an alarm instruction to a fault alarm device;

S303, the fault alarm device performs an alarm operation according to the alarm instruction.

The monitoring device in the embodiment may be a primary monitoring device or an auxiliary monitoring device, which is not specifically limited in this embodiment.

In S301, the monitoring device determines the detection result of the first device to be detected, where the detection result includes an abnormal detection result and a normal detection result.

An abnormal type of the abnormal detection result includes a working parameter abnormality, a connection state abnormality, a storage state abnormality and a log sequence abnormality.

In the embodiment, the first device to be detected is at least one of a vehicle motion device, an environment sensing device, a vehicle control device and a power device.

The vehicle motion device includes, but is not limited to, a speed sensor, an angle sensor and an integrated navigation device;

the environment sensing device includes, but is not limited to, a lidar sensor, a millimeter wave radar sensor, an ultrasonic sensor and a camera;

the vehicle control device includes, but is not limited to, a brake device, a steering device, an engine and a gearbox.

Exemplarily, if the first device to be detected is an engine, the primary monitoring device detects that a working parameter (such as an operating frequency, voltage, etc.) of the engine exceed a preset value, then the obtained detection result is the working parameter abnormality; if the first device to be detected is a lidar sensor, and the primary monitoring device detects that the lidar sensor is not connected, then the detection result is the connection state abnormality; if the first device to be detected is a power device, and the primary monitoring device detects that an electric quantity of the power device is lower than a preset electric quantity, then the obtained detection result is that the storage state abnormality of the electric quantity; if a log sequence of the first device to be detected is inconsistent with a normal log sequence of a preset scenario, then the obtained detection result is the log sequence abnormality.

Specifically, if the monitoring device is the primary monitoring device, the primary monitoring device determining that the detection result of the first device to be detected includes the following possible implementation manners:

in a possible implementation manner, the first information processing unit of the primary monitoring device obtains device information of the first device to be detected, determines whether the first device to be detected is abnormal according to the device information, and determines the detection result.

In another possible implementation, the first information processing unit of the primary monitoring device obtains the device information of the first device to be detected, and determines a first detection result of the first device to be detected according to the device information, and at the same time, the first information processing unit of the primary monitoring device receives a second detection result for the first device to be detected sent by the second communication unit of the auxiliary monitoring device. The second detection result also includes an abnormality detection result and a normal detection result. The second detection result may be the same as or different from the first detection result.

The first information processing unit of the primary monitoring device determines the detection result according to the first detection result and the second detection result. If the first detection result indicates that the first device to be detected is abnormal and the second detection result indicates that the first device to be detected is abnormal, it is determined that the first device to be detected is abnormal; and if the first detection result indicates that the first device to be detected is abnormal and the second detection result indicates that the first device to be detected is normal, it is determined that the first device to be detected is normal.

The above judging process combines the detection results of the primary monitoring device and the auxiliary monitoring device, which avoids a false alarm caused by misjudgment of the primary monitoring device and improves an accuracy of a system fault alarm mechanism.

In a further possible implementation, the first information processing unit of the primary monitoring device obtains the device information of the first device to be detected, determines whether the first device to be detected is abnormal according to the device information, and determines the detection result. Alternatively, the first information processing unit of the primary monitoring device determines the detection result according to the first detection result of the first device to be detected determined by itself and the second detection result of the first device to be detected sent by the auxiliary monitoring device.

If the detection result indicates that the first device to be detected is abnormal, the primary monitoring device sends a fault detection instruction to the first device to be detected, the fault detection instruction is configured to indicate that the first device to be detected performs a self-detection; the primary monitoring device receives a self-detection result fed back by the first device to be detected, and updates the detection result according to the self-detection result;

the primary monitoring device determines whether to send the alarm instruction to the fault alarm device according to the updated detection result. Specifically, if the updated detection result is the abnormal detection result, the primary monitoring device sends the alarm instruction to the fault alarm device.

The above judging process combines the detection results of the primary monitoring device, the auxiliary monitoring device and the first self-detection device of the device to be detected, which avoids a false alarm caused by an abnormality of the system monitoring devices, and improves the accuracy and flexibility of the system fault alarm mechanism.

In S303, the fault alarm device performs the alarm operation according to the alarm instruction sent by the primary monitoring device, or performs the alarm operation according to the alarm instruction sent by the auxiliary monitoring device, or performs the alarm operation according to the alarm instruction sent by the remote control device.

The fault alarm device of the embodiment includes at least one of an in-vehicle alarm device and an out-vehicle alarm device, where the in-vehicle alarm device includes at least one of an in-vehicle voice alarm device, a display alarm prompt device and an AR alarm prompt device; and the out-vehicle alarm device includes at least one of an alarm indicator light and an out-vehicle voice alarm device.

Alarm operations of different fault alarm devices are different, mainly including a visual reminder (the display alarm prompt device, the AR alarm prompt device, the alarm indicator light), a tactile reminder (seat vibration apparatus) and a sound reminder (the in-vehicle voice alarm device, out-vehicle voice alarm device).

In the fault alarm method provided by the embodiment of the present disclosure, a monitoring device determines a detection result of a first device to be detected, if the detection result indicates that the first device to be detected is abnormal, the primary monitoring device sends an alarm instruction to a fault alarm device, so that the fault alarm device performs a corresponding alarm operation according to the alarm instruction. The above method sends an alarm signal in time when the device on the vehicle is abnormal, so that a driver or people outside the vehicle takes an emergency response according to the alarm signal, thereby reducing the occurrence rate of a safety accident caused by the device fault in the system.

Figure 4:
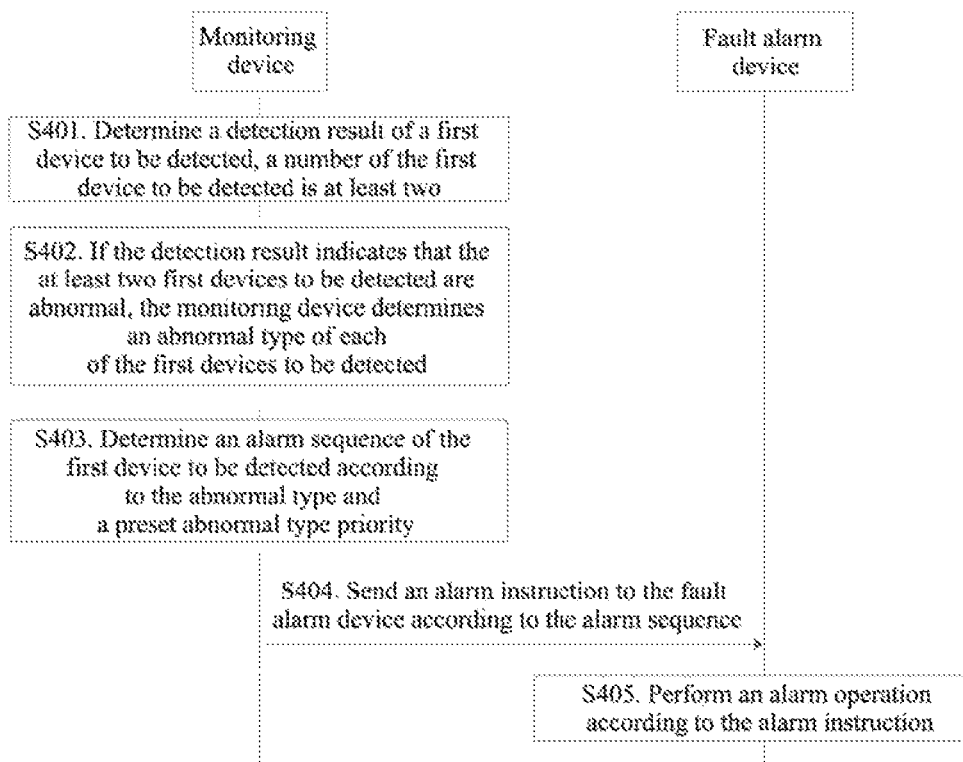
FIG. 4 is a schematic flowchart of a fault alarm method according to another embodiment of the present disclosure.

FIG. 4 is a schematic flowchart of a fault alarm method according to another embodiment of the present disclosure. As shown in FIG. 4, the fault alarm method provided by the embodiment includes the following steps:

S401, a monitoring device determines a detection result of a first device to be detected, a number of the first device to be detected is at least two;

S402, if the detection result indicates that the at least two first devices to be detected are abnormal, the monitoring device determines an abnormal type of each of the first devices to be detected;

S403, the monitoring device determines an alarm sequence of the first device to be detected according to the abnormal type and a preset abnormal type priority;

S404, the monitoring device sends an alarm instruction to a fault alarm device according to the alarm sequence;

In the embodiment, the abnormal type includes: a working parameter abnormality, a connection state abnormality, a storage state abnormality and a log sequence abnormality.

The preset abnormal type priority is that: a priority of the connection state abnormality> a priority of the log sequence abnormality> a priority of the working parameter abnormality> a priority of the storage state abnormality.

Exemplarily, if the monitoring device detects that a working parameter (such as an operating frequency, voltage, etc.) of an engine exceed a preset value and an electric quantity of a power device is lower than a preset electric quantity simultaneously, and determines that there is an working parameter abnormality in the engine, and there is a storage state abnormality in the power device, the monitoring device determines, according to the preset abnormal type priority, to send an alarm indication indicating that the engine is abnormal first, and then send an alarm indication indicating that the power device is abnormal.

S405, the fault alarm device performs an alarm operation according to the alarm instruction.

S401 and S405 of the embodiment are the same as S301 and S303 of the foregoing embodiment in terms of the implementation principle and technical effect, details of which can refer to the foregoing embodiment, and are not described herein again.

In an embodiment, an execution body of the foregoing embodiment may also be a remote control device. Specifically, according to device information or detection results of the at least two devices to be detected that are sent by the primary monitoring device and the auxiliary monitoring device, when it is determine that the at least two devices to be detected are abnormal, the remote control device determines an alarm sequence according to the abnormal type and the preset abnormal type priority, and sends an alarm instruction to the fault alarm device according to the alarm sequence.

In the fault alarm method provided by the embodiment of the present disclosure, if the monitoring device detects that at least two first devices to be detected are abnormal, it determines an abnormal type of each of the first devices to be detected, determines an alarm sequence of the first device to be detected according to the abnormal type and a preset abnormal type priority, and sends an alarm instruction to a fault alarm device according to the alarm sequence. The above method realizes further refinement of the system fault alarm mechanism, and reasonably classifies the faults of the device of the vehicle, and performs fault alarm according to a preset priority, so that a driver and people outside the vehicle take a response in time according to the alarm reminder, thereby reducing the occurrence rate of a safety accident caused by a fault in the system.

Figure 5:
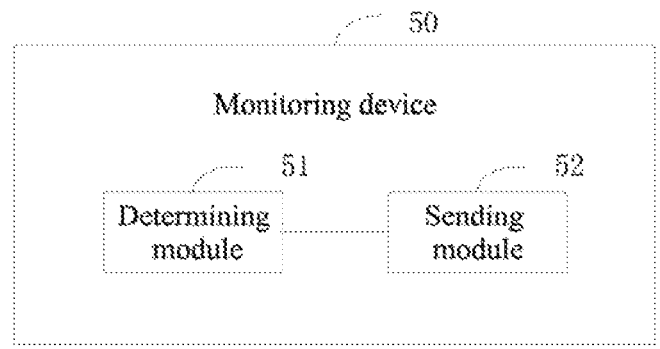
FIG. 5 is a schematic structural diagram of a monitoring device according to an embodiment of the present disclosure.

An embodiment of the present disclosure further provides a monitoring device, which can refer to FIG. 5. The embodiment of the present disclosure is described by way of example only in FIG. 5, and the present disclosure is not limited thereto.

FIG. 5 is a schematic structural diagram of a monitoring device according to an embodiment of the present disclosure. As shown in FIG. 5, the monitoring device 50 provided by the embodiment includes:

a determining module 51, configured to determine a detection result of first devices to be detected; and a sending module 52, configured to, if the detection result indicates that the first device to be detected is abnormal, send an alarm instruction to a fault alarm device, so that the fault alarm device performs an alarm operation according to the alarm instruction.

The monitoring device provided by the present disclosure includes a determining module and a sending module, the determining module is configured to determine a detection result of a first device to be detected, if the detection result indicates that the first device to be detected is abnormal, the sending module is configured to send an alarm instruction to a fault alarm device, so that the fault alarm device performs an alarm operation according to the alarm instruction. The monitoring device provided by the embodiment sends an alarm instruction to the fault alarm device in time when determining that the device of the vehicle is abnormal, and reminds a driver or people outside the vehicle to take an emergency response according to an alarm signal, thereby significantly reducing the occurrence rate of a safety accident caused by the device fault in the system.

In an embodiment, the determining module 51 is specifically configured to determine an abnormal type of each of the first devices to be detected;

the determining module 51 is further configured to determine an alarm sequence of the first device to be detected according to the abnormal type and a preset abnormal type priority; and the sending module 52 is specifically configured to send the alarm instruction to the fault alarm device according to the alarm sequence.

In an embodiment, the abnormal type of the first device to be detected that is abnormal includes: a working parameter abnormality, a connection state abnormality, a storage state abnormality and a log sequence abnormality.

In an embodiment, a priority of the connection state abnormality> a priority of the log sequence abnormality> a priority of the working parameter abnormality> a priority of the storage state abnormality.

The monitoring device provided by the embodiment can perform the technical solution of the foregoing method embodiment. The implementation principle and the technical effect are similar, and details are not described herein again.

Figure 6:
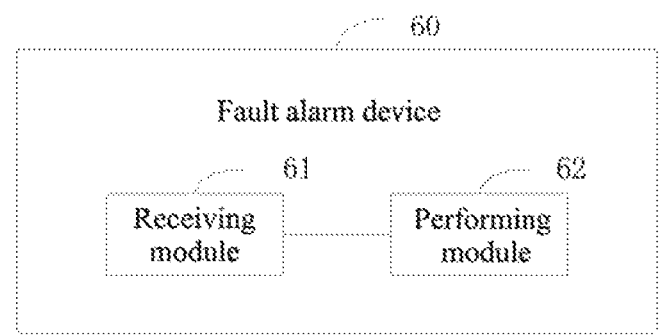
FIG. 6 is a schematic structural diagram of a fault alarm device according to an embodiment of the present disclosure.

The embodiment of the present disclosure further provides a fault alarm device, which can refer to FIG. 6. The embodiment of the present disclosure is described by way of example only in FIG. 6, and the present disclosure is not limited thereto.

FIG. 6 is a schematic structural diagram of a fault alarm device according to an embodiment of the present disclosure. As shown in FIG. 6, the fault alarm device 60 provided by the embodiment includes:

a receiving module 61, configured to receive an alarm instruction sent by a monitoring device; and a performing module 62, configured to perform an alarm operation according to the alarm instruction.

In an embodiment, the receiving module 61 is specifically configured to receive the alarm instruction sent by the monitoring device through a remote control device.

The fault alarm device provided by the embodiment can perform the technical solution of the foregoing method embodiment. The implementation principle and the technical effect are similar, and details are not described herein again.

Figure 7:
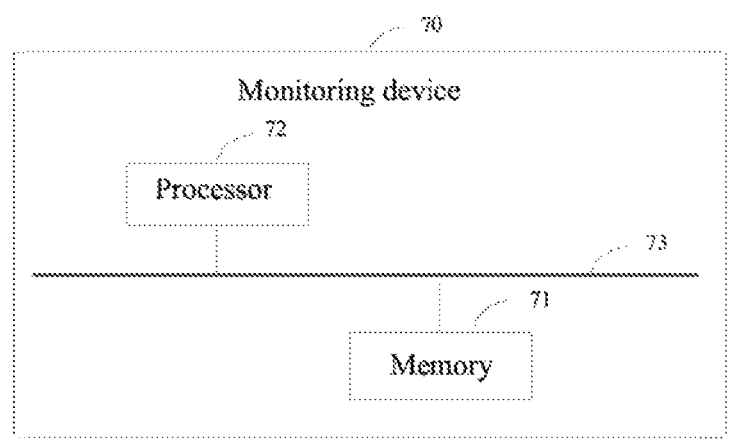
FIG. 7 is a schematic structural diagram of hardware of a monitoring device according to an embodiment of the present disclosure.

An embodiment of the present disclosure further provides a monitoring device, which can refer to FIG. 7. The embodiment of the present disclosure is described by way of example only in FIG. 7, and the present disclosure is not limited thereto.

FIG. 7 is a schematic structural diagram of hardware of a monitoring device according to an embodiment of the present disclosure, as shown in FIG. 7, the monitoring device 70 provided by the embodiment includes:

a memory 71;

a processor 72; and a computer program;

where the computer program is stored in the memory 71, and is configured to be executed by the processor 72 to implement the technical solution of any one of the foregoing method embodiments. The implementation principle and the technical effect are similar, and details are not described herein again.

In an embodiment, the memory 71 can be either independent or integrated with the processor 72.

When the memory 71 is a device independent from the processor 72, the monitoring device 70 further includes:

a bus 73, configured to connect the memory 71 and the processor 72.

An embodiment of the present disclosure further provides a computer readable storage medium, where a computer program stored on the computer readable storage medium, the computer program is executed by the processor 72 to implement the various steps performed by the monitoring device 70 in the method embodiments above.

Figure 8:
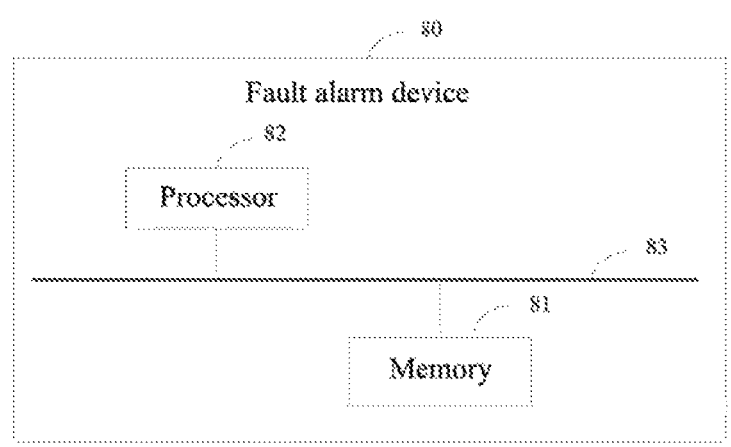
FIG. 8 is a schematic structural diagram of hardware of a fault alarm device according to an embodiment of the present disclosure.

An embodiment of the present disclosure further provides a fault alarm device, which can refer to FIG. 8. The embodiment of the present disclosure is described by way of example only in FIG. 8, and the present disclosure is not limited thereto.

FIG. 8 is a schematic structural diagram of hardware of a fault alarm device according to an embodiment of the present disclosure. As shown in FIG. 8, the fault alarm device 80 provided by the embodiment includes:

a memory 81;

a processor 82; and a computer program;

where, the computer program is stored in the memory 81, and is configured to be executed by the processor 82 to implement the technical solution of any one of the foregoing method embodiments. The implementation principle and the technical effect are similar, and details are not described herein again.

In an embodiment, the memory 81 can be either independent or integrated with the processor 82.

When the memory 81 is a device independent from the processor 82, the fault alarm device 80 further includes:

a bus 83, configured to connect the memory 81 and the processor 82.

An embodiment of the present disclosure further provides a computer readable storage medium, where a computer program is stored on the computer readable storage medium, the computer program is executed by the processor 82 to implement the various steps performed by the fault alarm device 80 in the method embodiments above.

It should be understood that the foregoing processor may be a Central Processing Unit (CPU), or may be another general purpose processor, a Digital Signal Processor (DSP), an Application Specific Integrated Circuit (ASIC), or the like. The general purpose processor may be a microprocessor, or the processor may also be any conventional processor or the like. The steps of the method disclosed in connection with the present disclosure may be directly embodied as being executed by a hardware processor or by a combination of hardware and software modules in the processor.

The memory may include high speed random access memory (RAM), and may also include non-volatile memory (NVM), such as at least one disk memory, and may also be a USB flash drive, a removable hard disk, a read only memory, a magnetic disk, an optical disk, or the like.

The bus may be an Industry Standard Architecture (ISA) bus, a Peripheral Component (PCI) bus, or an Extended Industry Standard Architecture (EISA) bus, or the like. The bus can be divided into an address bus, a data bus, a control bus, or the like. For ease of representation, the bus in the drawings of the present application is not limited to only one bus or one type of bus.

The above storage medium may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or optical disk. The storage medium may be any available media that can be accessed by a general purpose or special purpose computer.

An exemplary storage medium is coupled to the processor to enable the processor to read information from, and write information to, the storage medium. Of course, the storage medium can also be an integral part of the processor. The processor and the storage medium may be located in an Application Specific Integrated Circuit (ASIC). Of course, the processor and the storage medium may also exist as discrete components in an electronic device or a host device.

Finally, it should be noted that the above embodiments are only for explaining the technical solutions of the present disclosure, and are not limited thereto. Although the present disclosure has been described in detail with reference to the foregoing embodiments, it should be understood by those skilled in the art that: those skilled in the art still may modify the technical solutions described in the foregoing embodiments, or equivalently replace some or all of the technical features thereof; and the modifications or replacements do not deviate the essence of the corresponding technical solution from the scope of the technical solutions of the embodiments of the present disclosure.

What is claimed is:

1. An automatic driving system, comprising: a primary monitoring device, an auxiliary monitoring device, at least one device to be detected and a fault alarm device;

wherein the primary monitoring device and the auxiliary monitoring device are respectively connected to each device to be detected, the primary monitoring device and the auxiliary monitoring device are respectively connected to the fault alarm device;

the primary monitoring device and the auxiliary monitoring device are connected;

the auxiliary monitoring device is configured to determine a second detection result of each of the at least one device to be detected and send the second detection result of each of the at least one device to be detected to the primary monitoring device;

the primary monitoring device is configured to determine a first detection result of each of the at least one device to be detected, receive the second detection result of each of the at least one device to be detected sent by the auxiliary monitoring device, determine a detection result of each of the at least one device to be detected based on the first detection result of each of the at least one device to be detected and the second detection result of each of the at least one device to be detected, and send an alarm instruction to the fault alarm device if the detection result determined based on the first detection result and the second detection result indicates that any one of the at least one device to be detected is abnormal; and the fault alarm device is configure to perform an alarm operation according to the alarm instruction.

2. The system according to claim 1, wherein the at least one device to be detected comprises at least one of a vehicle motion device, an environment sensing device, a vehicle control device and a power device.

3. The system according to claim 2, wherein the vehicle motion device comprises at least one of a speed sensor, an angle sensor and an integrated navigation device.

4. The system according to claim 2, wherein the environment sensing device comprises at least one of a lidar sensor, a millimeter wave radar sensor, an ultrasonic sensor and a camera.

5. The system according to claim 2, wherein the vehicle control device comprises at least one of a brake device, a steering device, an engine and a gearbox.

6. The system according to claim 1, further comprising: a remote control device, wherein the remote control device is respectively connected to the primary monitoring device, the auxiliary monitoring device and the fault alarm device;

the primary monitoring device and the auxiliary monitoring device send the alarm instruction to the fault alarm device through the remote control device accordingly.

7. The system according to claim 1, wherein the fault alarm device comprises at least one of an in-vehicle alarm device and an out-vehicle alarm device.

8. The system according to claim 7, wherein the in-vehicle alarm device comprises at least one of an in-vehicle voice alarm device, a display alarm prompt device and an AR alarm prompt device.

9. The system according to claim 7, wherein the out-vehicle alarm device comprises at least one of an alarm indicator light and an out-vehicle voice alarm device.

10. A fault alarm method, comprising:

determining, by a primary monitoring device, a first detection result of a first device to be detected;

receiving, by the primary monitoring device, a second detection result of the first device to be detected sent by an auxiliary monitoring device;

determining, by the primary monitoring device, a detection result of the first device to be detected based on the first detection result of the first device to be detected and the second detection result of the first device to be detected; and if the detection result determined based on the first detection result and the second detection result indicates that the first device to be detected is abnormal, sending, by the primary monitoring device, an alarm instruction to a fault alarm device, so that the fault alarm device performs an alarm operation according to the alarm instruction.

11. The method according to claim 10, wherein there are at least two first devices to be detected that are abnormal; the if the detection result determined based on the first detection result and the second detection result indicates that the first device to be detected is abnormal, sending, by the primary monitoring device, an alarm instruction to a fault alarm device comprises:

determining, by the primary monitoring device, an abnormal type of each of the first devices to be detected;

determining, by the primary monitoring device, an alarm sequence of the first device to be detected according to the abnormal type and a preset abnormal type priority; and sending, by the primary monitoring device, the alarm instruction to the fault alarm device according to the alarm sequence.

12. The method according to claim 10, wherein the abnormal type of the first device to be detected that is abnormal comprises: a working parameter abnormality, a connection state abnormality, a storage state abnormality and a log sequence abnormality.

13. The method according to claim 12, wherein a priority of the connection state abnormality > a priority of the log sequence abnormality > a priority of the working parameter abnormality > a priority of the storage state abnormality.

14. The method according to claim 10, wherein the sending, by the monitoring device, an alarm instruction to a fault alarm device comprises:

sending, by the monitoring device, the alarm instruction to the fault alarm device through a remote control device.

15. A primary monitoring device, comprising:

a memory, a processor, and a computer program stored on the memory and operable on the processor, wherein the processor, when running the computer program, is configured to:

determine a first detection result of a first device to be detected;

receive a second detection result of the first device to be detected sent by an auxiliary monitoring device;

determine a detection result of the first devices to be detected based on the first detection result of the first device to be detected and the second detection result of the first device to be detected; and if the detection result determined based on the first detection result and the second detection result indicates that the first device to be detected is abnormal, send an alarm instruction to a fault alarm device, so that the fault alarm device performs an alarm operation according to the alarm instruction.

16. The primary monitoring device according to claim 15, wherein the processor is further configured to:

determine an abnormal type of each of the first devices to be detected;

determine an alarm sequence of the first device to be detected according to the abnormal type and a preset abnormal type priority; and send the alarm instruction to the fault alarm device according to the alarm sequence.

17. The primary monitoring device according to claim 15, wherein the abnormal type of the first device to be detected that is abnormal comprises: a working parameter abnormality, a connection state abnormality, a storage state abnormality and a log sequence abnormality.

18. The primary monitoring device according to claim 17, wherein a priority of the connection state abnormality > a priority of the log sequence abnormality > a priority of the working parameter abnormality > a priority of the storage state abnormality.

19. The primary monitoring device according to claim 15, wherein the processor is further configured to:
send the alarm instruction to the fault alarm device through a remote control device.

\* \* \* \* \*